3,269,910
3(β-HYDROXYETHYL)-IMINOSTEROIDS OF THE PREGNANE SERIES AND METHODS OF ADMINISTRATION
Klaus Irmscher, Darmstadt, Germany, assignor to E. Merck Aktiengesellschaft, Darmstadt, Germany
No Drawing. Filed July 29, 1963, Ser. No. 298,412
13 Claims. (Cl. 167—74)

The present invention relates to new and useful steroids of the pregnane series.

It is an object of this invention to provide novel compounds having a valuable physiological activity as well as compositions containing these compounds together with pharmaceutically acceptable excipients.

It is a further object of this invention to provide a new process for producing said compounds.

The new compounds of this invention include those represented by the Formula I

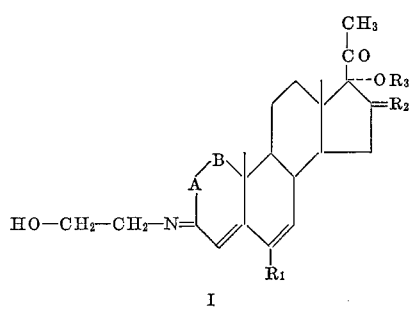

I wherein:
 $R_1$ means hydrogen, methyl, fluorine or chlorine;
 $R_2$ means H,H; α—H, β—CH$_3$; β—H, α—CH$_3$; or CH$_2$;
 $R_3$ means an aliphatic acyl residue containing from 2 to 11 carbon atoms;
 A–B means —CH$_2$—CH$_2$—; —CH=CH—; or

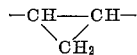

The new compounds are characterized by particularly good oral effectiveness. They exhibit a strong gestagenic activity.

The new compounds of this invention may be obtained by reacting the corresponding 3-keto steroids with β-hydroxyethylamine to form a Schiff base.

The reaction may be carried out in the presence of an inert solvent or mixtures thereof, for example carbon tetrachloride, benzene, toluene, ethanol, butanol, dioxane. Often the β-hydroxyethylamine itself may serve as solvent. Since water is formed in the course of the reaction, it is sometimes advisable to employ two solvents one of which dissolves the steroid and the β-hydroxyethylamine whereas the other one forms an azeotropical mixture with water and is distilled off during or after the reaction. If an inert solvent is employed, a slight excess of β-hydroxyethylamine (calculated on the mole proportions) is sufficient for carrying out the reaction.

In order to obtain a sufficient rate of reaction, it is advisable to heat the mixture to temperatures between 50 and 120° C. If the reaction is carried out in an excess of the amine, generally the Schiff base crystallizes on cooling or upon dilution with water. Otherwise, it may be isolated by extraction from the aqueous solution. If inert solvents have been employed the Schiff bases are preferably obtained by concentration of the reaction mixture or by evaporating the solvent. The obtained crude product is then recrystallized.

According to the process of this invention, Schiff bases are obtained wherein the oxygen atom of the 3-position is substituted by the β-hydroxyethylimino group. The keto group in the 20-position does not react with the β-hydroxyethylamine as it is hindered from the O-acyl residue in the 17-position.

A large number of the starting materials which are 3-keto steroids of the Formula II

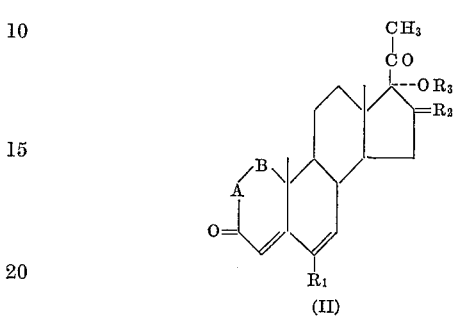

(II)

wherein $R_1$, $R_2$, $R_3$ and A–B have the above defined significance, are known and described, for example, in JACS 1959, page 5991; J. Org. Chemistry 1961, vol. 26, pp. 871 and 4774; Chemische Berichte 1961, vol. 94, p. 1225; German Patents 1,120,446; 1,122,950; and 1,119,266; Belgian Patent 597,044; South African Patent 62/3000.

It is further possible to use the compounds described in the above cited references in the preparation of further starting materials corresponding to Formula II. Thus, compounds saturated in the 1,2-position may be dehydrogenated in any known manner by chemical or microbiological reagents to form the Δ$^1$-compounds. In a similar manner, all compounds saturated in the 6-position may be dehydrogenated in the usual way by the action of chloranil whereby the corresponding Δ$^6$-compounds are formed. For instance, starting materials of the general Formula II may be obtained by this reaction from the compounds described in J. Med. Pharm. Chemistry, 1962, vol. 5, p. 975. If one of the known compounds as cited above is, for example, devoid of a 6-chloro- or 6-fluoro-substituent, these ones may be introduced into the corresponding Δ$^6$-compounds via the 6α,7α-oxido steroids. The oxido ring is split in the usual way with hydrogen fluoride or hydrogen chloride as the case may be. The 1,2-cyclomethylene starting compounds may be obtained from any compound of the Formula II which is unsaturated in the 1,2-position. The Δ$^1$-compounds are reacted in a manner known per se with diazomethane and subsequently pyrolyzed (cf. Chemische Berichte, 1960, vol. 93, p. 1710).

The 17-acyl derivatives corresponding to Formula II are prepared from the 17α-hydroxy compounds which are esterified in the usual way with the desired acid. Preferred acids are aliphatic acids containing from 2 to 11 carbon atoms, such as acetic, propionic, butyric, capronic, enanthic, caprylic, caprinic, or undecylenic acid.

6,16β-dimethyl compounds conforming to Formula II are available from 16β-methyl-4-pregnene-17α-ol-3,20-dione-17-acetate (cf. J. Med Pharm. Chemistry 1962, vol. 5, p. 975) which is converted into the corresponding 3-enolether and then reacted with carbon tetrabromide. Subsequent hydrogenation results in the formation of the corresponding 6,16β - dimethyl-compound (c.f. DBP 1,105,412).

The new β-hydroxyethylimino compounds of this invention may be used as drugs in veterinary or human medicine. They can be worked up into all forms of application which are customary for pharmaceutical purposes, such as pills, tablets, coated tablets, solutions, emulsions or suspensions. In general, the pharmaceutical preparations contain from 1 to 100 mg. of the active ingredient per unit dosage form, preferably from 1 to 10 mg.

The new compounds are useful to treat all types of pathological conditions often treated with 17α-acetoxy progesterone or 17α-acetoxy - 6α-methyl-progesterone. For instance, the substances are suitable as means for combating threatening abortion, for restoring the uterus mucous membranes, for inhibiting ovulation or in functional uterine bleeding.

Furthermore, the new 3β-hydroxyethylimino steroids of this invention may be combined with estrogenic substances such as ethynyl estradiol or the 3-ethers or esters thereof. Such combinations are especially suitable for the treatment of amenorrhoe and for all indications in corpus-luteum therapy. In addition, such combinations may be used in all cases where an antiovulatoric effect is desired.

The following examples are given solely for illustration and are not to be construed as limitations of this invention.

Example 1

5 g. of 6-chloro-6-dehydro - 17α-acetoxy-progesterone are dissolved in 100 ml. of ethanol and 100 ml. of chloroform. 850 mg. of β-hydroxyethylamine and 50 ml. of benzene are added. The reaction mixture is evaporated on the steam bath whereby the 3-(β-hydroxyethyl)-imino-6-chloro - 4,6-pregnadiene - 17α-ol-20-one-17-acetate begins to crystallize. Melting point after recrystallization from methanol: 200–203° C.; $(\alpha)_D^{23}$ —24° (chloroform); $\lambda_{max}$ 280 m$\mu$, $$E_{1\,cm.}^{1\%} 533$$

Example 2

10 g. of the caproate of 6-chloro-6-dehydro-17α-hydroxy-progesterone are dissolved in a mixture of 50 ml. of chloroform and 50 ml. of ethanol. 1.45 g. of β-hydroxyethylamine and 50 ml. of benzene are added to the reaction mixture which is then evaporated, finally under reduced pressure. The residue is recrystallized from ethyl acetate. The 3-(β-hydroxyethyl)-imino-6-chloro-4,6-pregnadiene-17α-ol-20-one-17-caproate thus obtained melts at 157° C.; $(\alpha)_D^{24}$ —22,5° (chloroform);

$$\lambda_{max} 277-278 \text{ m}\mu$$
$$E_{1\,cm.}^{1\%} 568$$

IR–bands at 1740, 1715 and 1605 cm.$^{-1}$.

In a similar manner, 3-(β-hydroxyethyl)-imino-6-chloro-4,6-pregnadiene-17α-ol-20-one-17-enanthate is obtained from 6-chloro-4,6-pregnadiene - 17α-ol-3,20-dione-17-enanthate.

Example 3

In a manner similar to Example 1, 3-(β-hydroxyethyl)-imino-6-chloro - 16β-methyl-4,6-pregnadiene - 17α-ol-20-one-17-acetate is obtained from 6-chloro-16α-methyl-4,6-pregnadiene-3,20-dione-17α-ol-17-acetate.

Example 4

In a manner similar to Example 1, 3-(β-hydroxyethyl)-imino-6-methyl-4,6-pregnadiene - 17α-ol-20-one-17-acetate is prepared from 6-methyl-6-dehydro-17α-acetoxy-progesterone.

Instead of the acetate, the undecylenate can be used as well.

Example 5

10 g. of 6-methyl-16-methylene-1,4,6-pregnatriene-17α-ol-3,20-dione-17-acetate are heated with stirring for 1 hour to 80° C. with 100 ml. of β-hydroxyethylamine. After cooling, 1250 ml. of chloroform are added. The mixture is washed several times with water. The chloroform layer is dried with sodium sulfate and then concentrated. The crude product is recrystallized from ethyl acetate whereby the pure 3-(β-hydroxyethyl)-imino-6-methyl-16-methylene - 1,4,6-pregnatriene - 17α-ol-20-one-17-acetate is obtained.

Example 6

In a manner similar to Example 5, 3-(β-hydroxyethyl)-imino - 6-fluoro - 1,4,6-pregnatriene - 17α-ol-20-one-17-propionate is prepared from 6-fluoro-1,4,6-pregnatriene-17α-ol-3,20-dione-17-propionate.

Example 7

7.5 g. of 1α,2α-cyclomethylene - 6-chloro-4,6-pregnadiene-17α-ol-3,20-dione-17-acetate are dissolved in 40 ml. of chloroform and 40 ml. of ethanol. After addition of 1250 mg. of β-hydroxyethylamine in 40 ml. of benzene, the reaction mixture is heated on the steam bath to evaporate the solvents, finally under reduced pressure. The 1α,2α-cyclomethylene - 3-(β-hydroxyethyl)-imino-6-chloro - 4,6-pregnadiene - 17α-ol-20-one-17-acetate precipitates and is purified by recrystallization from ethanol.

Example 8

In a manner similar to Example 7, 1α,2α-cyclomethylene-3-(β-hydroxyethyl)-imino - 16-methylene - 4,6-pregnadiene-17α-ol-20-one-17-acetate is prepared from 1α,2α-cyclomethylene - 16-methylene - 4,6-pregnadiene - 17α-ol-3,20-dione-17-acetate.

Example 9

8 g. of 6,16α-dimethyl-4,6-pregnadiene-17α-ol-20-one-17-acetate are dissolved in a mixture consisting of 120 ml. ethanol and 120 ml. chloroform. 750 mg. of β-hydroxyethylamine and 70 ml. of benzene are added to the reaction mixture. The solvents are distilled off by heating on the steam bath under reduced pressure (about 200 mm. Hg). The crude 3-(β-hydroxyethyl)-imino-6,16α-dimethyl-4,6-pregnadiene-17α-ol-20-one-17-acetate is recrystallized from methanol.

According to this method, the corresponding 6,16β-dimethyl compound is obtained from 6,16β-dimethyl-4,6-pregnadiene-17α-ol-20-one-17-acetate.

Example 10

5 g. of 6-methyl-16-methylene-4,6-pregnadiene-17α-ol-3,20-dione-17-acetate are dissolved in 100 ml. of carbon tetrachloride and 100 ml. of ethanol. 850 ml. of β-hydroxyethylamine are then added with 50 ml. of benzene. The solution is heated for about 1 hour on the steam bath, whereupon the solvents are evaporated under reduced pressure. The 3-(β-hydroxyethyl)-imino-6-methyl-16-methylene-4,6-pregnadiene-17α-ol-20-one-17-acetate is recrystallized from ethyl acetate.

Instead of the 17-acetate, the following 17-acylates may be prepared as well: butyrate, caproate, enanthate, caprylate, caprinate, undecylenate.

Examples for pharmaceutical preparations:

(A) Tablets: Mg.
  3 - (β - hydroxyethyl) - imino - 6 - chloro - 4,6-
    pregnadiene-17α-ol-20-one-17-acetate _____ 2
  Lactose _____ 78
  Potato starch _____ 20
(B) Tablets:
  3 - (β - hydroxyethyl) - imino - 6 - chloro - 4,6-
    pregnadiene-17α-ol-20-one-17-enanthate ____ 5
  Lactose _____ 70
  Corn starch _____ 23
  Magnesium stearate _____ 2
(C) Coated tablets:
  1α,2α - cyclomethylene - 3 - (β - hydroxyethyl)-
    imino - 6 - chloro - 4,6 - pregnadiene - 17α-ol-
    20-one-17-acetate _____ 3
  Lactose _____ 80
  Corn starch _____ 15
  Talc _____ 2

The coating is a mixture of corn starch, sugar, talc and tragacanth.

(D) Tablets:                                                                 Mg.
 3 - (β - hydroxyethyl) - imino - 6 - chloro - 4,6-
  pregnadiene-17α-ol-20-one-17-acetate _____        4
 Ethynyl estradiol _____             0.04
 Lactose _____              85
 Potato starch _____             10
 Talc _____             2

(E) Tablets:
 3 - (β - hydroxyethyl) - imino - 6 - chloro - 4,6-
  pregnadiene-17α-ol-20-one-17-acetate _____        3
 Ethynyl estradiol methylether _____         0.08
 Corn starch _____             10
 Lactose _____             85
 Magnesium stearate _____             2

What is claimed is:
1. 3-β-hydroxyethylimino steroids of the pregnane series having the Formula I

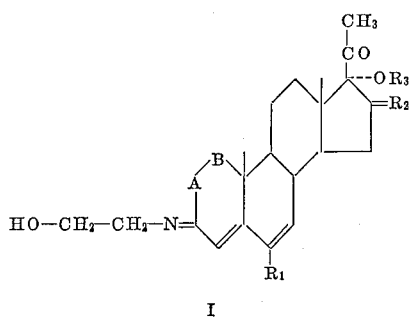

I wherein:
R$_1$ is a member of the group consisting of hydrogen, methyl, fluorine and chlorine;
R$_2$ is a member of the group consisting of H, H; α—H, β—CH$_3$; β—H, α—CH$_3$; and CH$_2$;
R$_3$ means an aliphatic acyl residue containing from 2 to 11 carbon atoms; and A–B designates a member of the group consisting of —CH$_2$—CH$_2$—; —CH=CH—; and

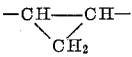

2. 3 - (β - hydroxyethyl) - imino - 6 - chloro - 4,6-pregnadiene-17α-ol-20-one-17-acetate.
3. 3 - (β - hydroxyethyl) - imino - 6 - chloro - 4,6-pregnadiene-17α-ol-20-one-17-enanthate.
4. 1α,2α - cyclomethylene - 3 - (β - hydroxyethyl)-imino - 6 - chloro - 4,6 - pregnadiene - 17α - ol - 20 - one-17-acetate.
5. 3 - (β - hydroxyethyl) - imino - 6 - chloro - 16α-methyl-4,6-pregnadiene-17α-ol-20-one-17-acetate.
6. 3 - (β - hydroxyethyl) - imino - 6 - methyl - 4,6-pregnadiene-17α-ol-20-one-17-acetate.
7. 3 - (β - hydroxyethyl) - imino - 6 - methyl - 16-methylene-4,6-pregnadiene-17α-ol-20-one-17-acetate.
8. 3 - (β - hydroxyethyl) - imino - 6 - methyl - 16-methylene-1,4,6-pregnatriene-17α-ol-20-one-17-acetate.
9. 3 - (β - hydroxyethyl) - imino - 6,16α - dimethyl-4,6-pregnadiene-17α-ol-20-one-17-acetate.
10. 1α,2α - cyclomethylene - 3 - (β - hydroxyethyl)-imino - 16 - methylene - 4,6 - pregnadiene - 17α - ol - 20-one-17-acetate.
11. A pharmaceutical composition in unit dosage form containing 1–100 mg. of a compound of Formula I as shown and defined in claim 1 together with pharmaceutically acceptable carriers.
12. A pharmaceutical composition in unit dosage form containing 1–100 mg. of a compound of Formula I as shown and defined in claim 1; a member of the group consisting of ethinyl estradiol and ethinyl estradiol methylether; and a pharmaceutical carrier.
13. A method of effecting gestagenic activity in mammals which comprises administering to said mammals an effective amount of a compound of Formula I as shown and defined in claim 1.

References Cited by the Examiner
Irmscher: "Chem. Berichte" (1962), pp. 907–917 relied on.

LEWIS GOTTS, *Primary Examiner.*
ELBERT ROBERTS, *Assistant Examiner.*